(12) United States Patent
Dintner et al.

(10) Patent No.: US 7,066,518 B2
(45) Date of Patent: Jun. 27, 2006

(54) CABRIOLET VEHICLE WITH A CHECK DEVICE FOR CHECKING A GIVEN CONVERTIBLE TOP STOWAGE VOLUME

(75) Inventors: Thomas Dintner, Fuerstenfeldbruck (DE); Peter Reihl, Starnberg (DE)

(73) Assignee: Webasto Vehicle Systems International GmbH, Stockdork (DE)

( * ) Notice: Subject to any disclaimer, the term of this patent is extended or adjusted under 35 U.S.C. 154(b) by 0 days.

(21) Appl. No.: 10/395,890

(22) Filed: Mar. 25, 2003

(65) Prior Publication Data
US 2003/0218346 A1 Nov. 27, 2003

(30) Foreign Application Priority Data
Mar. 26, 2002 (DE) .................. 102 13 553

(51) Int. Cl.
*B60J 7/20* (2006.01)
(52) U.S. Cl. .................. 296/37.1; 296/107.08
(58) Field of Classification Search .............. 296/37.5, 296/107.08, 98, 37.1
See application file for complete search history.

(56) References Cited

U.S. PATENT DOCUMENTS

| | | | |
|---|---|---|---|
| 3,896,590 A * | 7/1975 | Miller | 49/489.1 |
| 4,561,691 A * | 12/1985 | Kawai et al. | 296/216.04 |
| 4,894,952 A * | 1/1990 | Trett et al. | 49/25 |
| 5,198,974 A * | 3/1993 | Orsat | 700/56 |
| 5,540,269 A * | 7/1996 | Plumer | 160/3 |
| 5,649,733 A * | 7/1997 | Seel et al. | 296/37.5 |
| 5,654,615 A | 8/1997 | Brodsky | |
| 6,116,320 A * | 9/2000 | Peterson | 160/84.02 |
| 6,404,158 B1 * | 6/2002 | Boisvert et al. | 318/469 |
| 6,491,332 B1 * | 12/2002 | De Ceuster | 296/37.16 |
| 6,568,732 B1 * | 5/2003 | De Gaillard | 296/24.1 |
| 6,676,189 B1 * | 1/2004 | Schall et al. | 296/100.12 |

FOREIGN PATENT DOCUMENTS

| | | |
|---|---|---|
| DE | 198 45 154 A1 | 4/2000 |
| DE | 199 57 174 C1 | 4/2001 |
| DE | 10131892 A1 * | 1/2003 |
| DE | 10202733 A1 * | 8/2003 |
| EP | 1228914 A2 * | 1/2003 |

OTHER PUBLICATIONS

Force & Mass, The Physics Hypertextbook, http://hypertextbook.com/physics/mechanics/newton-second/.*
Levers and Torque, http://shark.comfsm.fhm/~dleeling/physics/torque.html.*

* cited by examiner

*Primary Examiner*—Dennis H. Pedder
(74) *Attorney, Agent, or Firm*—David S. Safran

(57) ABSTRACT

A cabriolet vehicle with a combined convertible top-luggage stowage space (16), of which one partial volume constitutes a the convertible top stowage volume (14) and another partial volume constitutes a luggage stowage volume which borders the convertible top stowage volume (14), has a checking device (24, 30, 34) for checking the convertible top stowage volume (14). The checking device has a movement element (24) that can be moved along a boundary (22) which separates the convertible top stowage volume (14) from the luggage stowage volume and which can be remotely controlled. The movement element is driven by a drive device (30) and is provided with sensors (34, 36) such that, during the motion of the movement element (24) preparatory to stowage of a hard top convertible roof, the presence of articles which project from the luggage stowage volume into the convertible top stowage volume (14) can be detected.

27 Claims, 4 Drawing Sheets

CABRIOLET VEHICLE WITH A CHECK DEVICE FOR CHECKING A GIVEN CONVERTIBLE TOP STOWAGE VOLUME

BACKGROUND OF THE INVENTION

1. Field of the Invention

The invention relates to a cabriolet vehicle with a combined convertible top-luggage stowage space, of which a partial volume is stipulated as the convertible top stowage volume and another partial volume as a luggage stowage volume which borders the convertible top stowage volume, the motor vehicle having a check device for checking the stipulated convertible top stowage volume, for which one movement element can be moved along a boundary which separates the convertible top stowage volume from the luggage stowage volume.

2. Description of Related Art

Examples of motor vehicles of the initially mentioned type are, for example, the Mercedes SLK, Lexus SC430 and Peugeot 206CC. In these vehicles, the convertible top stowage volume can be separated from the luggage stowage volume by a manually operated, separating shade. The intended end position detection and control coupled to the shade ensure that the convertible top can be stowed in the convertible top stowage volume only when the leading edge of the separating shade is in its end position, by which it is implicitly ensured that the required convertible top stowage volume is not diminished by articles which have been stored in the luggage stowage volume.

The known approach has the disadvantage of a lack of operating ease, since the convertible top cannot be stowed in the stowage space intended for it if the separating shade is not in the end position and does not trigger end position detection. In this case, the driver or another individual must leave the vehicle to open the trunk to move the separating shade manually into the end position.

SUMMARY OF THE INVENTION

A primary object of the present invention is to provide a cabriolet vehicle of the initially mentioned type which is more easily operated.

This object is achieved by the features described herein below.

The invention is based on the mentioned prior art but differs in that the check device can be remotely controlled and is driven by a drive device and is provided with sensors such that, during the motion of the movement element, the presence of articles which project from the luggage stowage volume into the convertible top stowage volume can be detected.

By providing a drive device, manual actuation can be omitted. But this should not preclude the fact that in spite of the provided drive device the check device cannot be manually actuated either. As a result of the remote control capacity the check device can be moved for example from the vehicle interior without leaving the vehicle by actuating a corresponding switch.

The sensors ensure that an article is detected which is projecting into the convertible top stowage volume so that the driver can also be notified about the presence of these articles with remote control.

The aforementioned boundary should not be understood as a "sharp" boundary. It is rather a boundary area which separates a volume sufficient for stowing the convertible top from the total volume of the convertible top-luggage stowage space. This boundary can be a plane, a surface curved around one of more spatial axes or a flat article composed of several flat pieces.

The presence of articles projecting into the convertible top stowage volume can be detected, for example, in that the sensors monitor a quantity which is proportional to the drive force required by the drive device for moving the movement element. This has the advantage that the sensors in their mounting location are independent of the path of the movement element.

In the case of collision of the movement element with an article which is projecting into the convertible top stowage volume, the convertible top is protected from damage and the driver has the opportunity to remove the disruptive article. This can be achieved in that the sensors report the detected value of the monitored quantity to a control which compares the acquired value with a predetermined threshold value which separates an impermissible range of values from an allowed range of values, and then outputs a warning signal to the driver and blocks the convertible top drive and/or a convertible top stowage space cover drive (for example, the drive of the cover of the convertible top compartment) when the acquired value is in the impermissible range.

The sensors can be made especially simply when the drive device is an electric motor and the quantity which is monitored by the sensors is the motor current which flows through the electric motor. In this case, a current measurement means, which is located anywhere in the power supply wiring of the electric motor, is sufficient as the sensor.

Alternatively or additionally, an article projecting into the convertible top stowage space can also be detected by the movement element as the sensor being provided with a collision sensor which detects collision of the movement element with an article in its path. Thus, not only can redundancy in the detection of an article be achieved, but such an article can be directly detected by a collision sensor; this reduces the possibility of error in detection.

The aforementioned protection of the convertible top and notification of the driver about insufficient convertible top stowage volume can be achieved, in this embodiment, in that the sensors, in the case of a collision, report a corresponding signal to the control which thereupon outputs a warning signal to the driver and blocks the convertible top drive and/or the convertible top stowage space cover drive.

The collision sensor can be executed, in a conventional manner, such as for the pinch protection used in sliding roofs and electrical window raisers, especially so-called indirect pinch protection. Alternatively or additionally, it is possible that the collision sensor is made as a contact sensor and/or as a photoelectric barrier.

In particular, the use of a photoelectric barrier makes it possible to use a movement element with an extremely small structural volume. It can be sufficient to place a movable light source on one side of the vehicle so that it emits light essentially in the transverse direction of the vehicle to a light sensor which is located on the other side of the vehicle and which is preferably moved together with the light source.

One simple possibility for detection of the instant at which checking of the stipulated convertible top stowage volume is completed can be accomplished, for example, by the sensors having at least one end position sensor at least at an end point of the path of the movement element.

When checking of the given convertible top stowage volume has been completed, stowage of the convertible top can be easily enabled by the driver by the sensor's report to the control that the sensor has reached its end position, which thereupon releases a convertible top drive and/or a convertible top stowage space cover drive.

According to one preferred embodiment, the check device can be used not only for checking the available convertible top stowage volume, but also for its separation from the luggage stowage volume. This can take place by the movement element being connected to a separation device by which the convertible top stowage volume can be separated from the luggage stowage volume. If the movement element, after checking, is in its end position, it has extended the separation device connected to it along the boundary so that loose articles which are present, for example, in the luggage stowage volume cannot strike the convertible top, but only the separation device, while driving.

The separation device can be provided, in a space-saving manner, as a separating net or louvered screen. These separating devices can be, for example, stowed in a magazine, rolled-up or stacked.

Since the cabriolet vehicle in accordance with the invention acquires a special value by the above described check device, independent protection is sought for it.

The invention is explained in detail below with reference to the attached drawings and preferred embodiments.

DETAILED DESCRIPTION OF THE INVENTION

Figure 1:
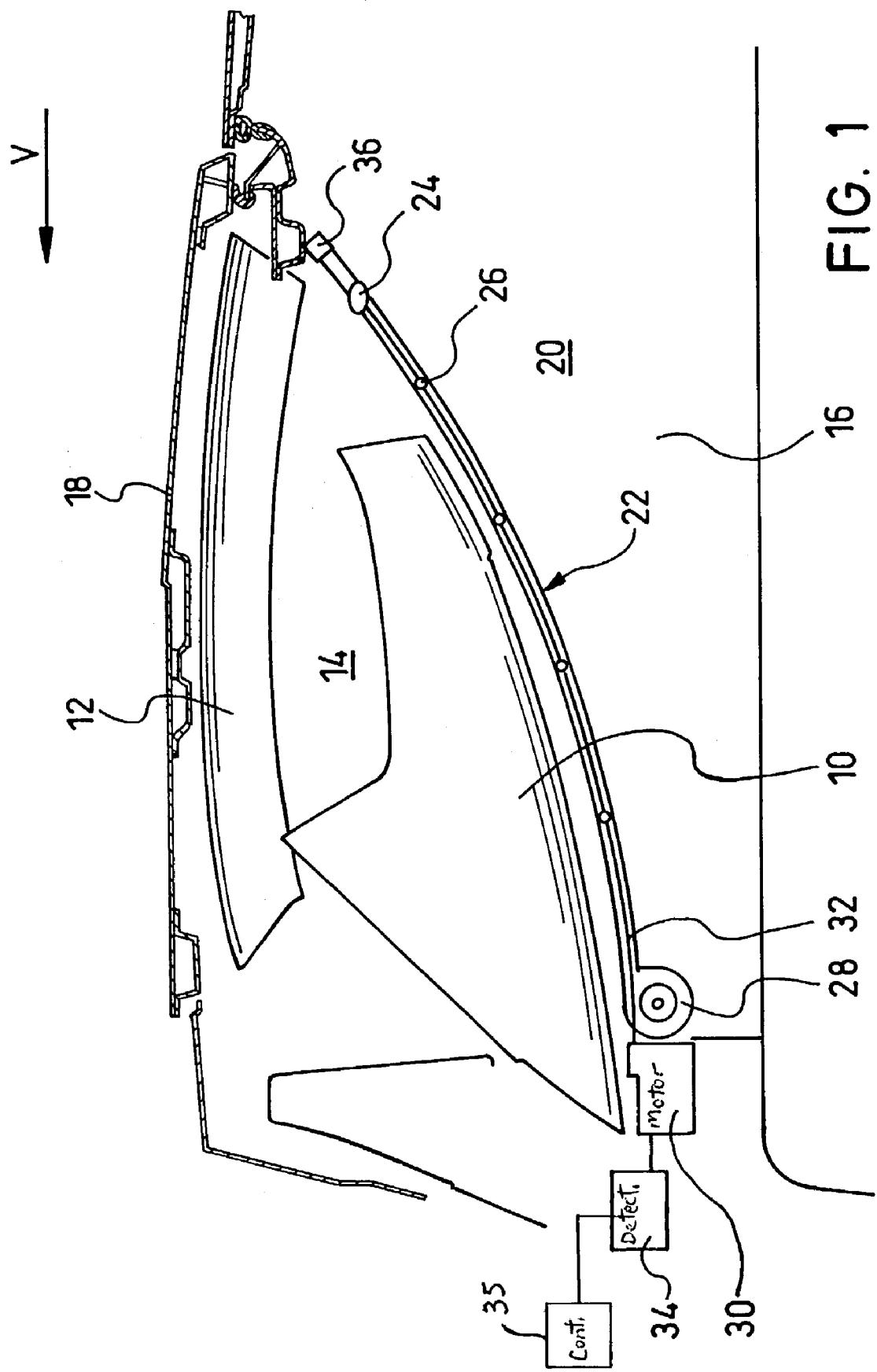
FIG. 1 shows a rough schematic cross section of one area of the convertible top stowage space of a first embodiment of the motor vehicle in accordance with the invention.

In FIG. 1, the area of the convertible top stowage space of the motor vehicle in accordance with a first embodiment of the invention is shown having a rear part 10 and a cover part 12 of a hardtop stowed as a folded package in a stowage volume 14 of a combined convertible top-luggage stowage space 16. The forward driving direction of the motor vehicle is identified by the arrow V. The stowage volume 14 is upwardly closed by the convertible top hatch 18.

Figure 4:
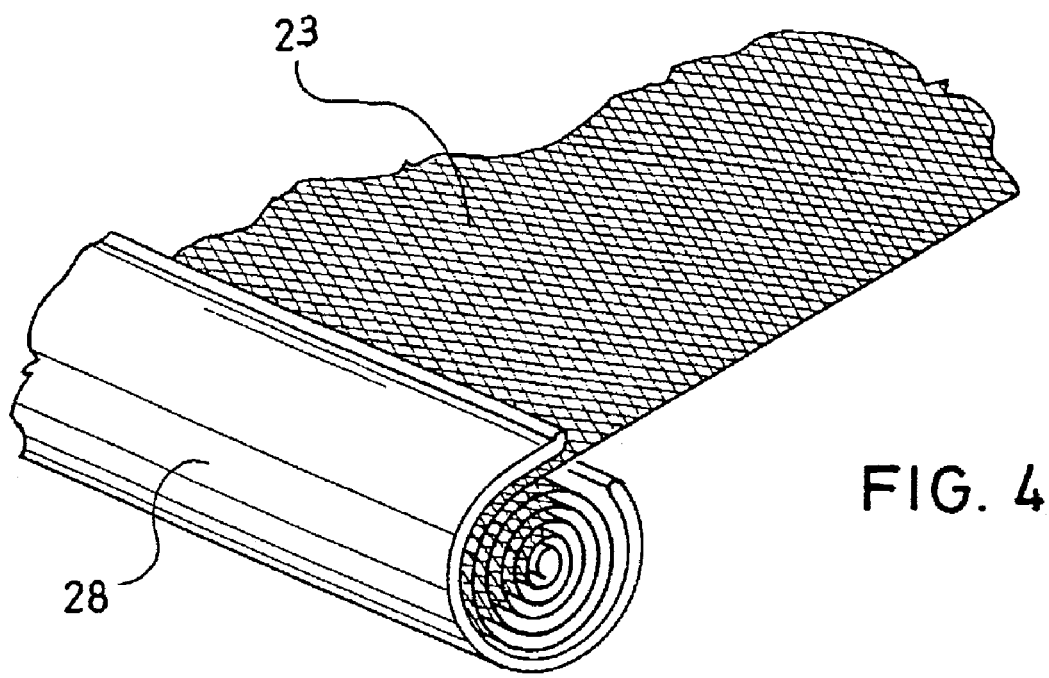
FIG. 4 shows an embodiment using a net screen as a separation device.

On the inside wall 20 of the motor vehicle shown in FIG. 1, there is a guide rail 22 along which a flexible separation device, for example, a net screen 23 (FIG. 4), is moved. The movement element for the net screen separation device is a drive bow 24. The net screen 23, which is connected to the drive bow 24, is supported by additional auxiliary bows 26 which, in the extended state of the net screen, are located essentially equidistantly spaced along the guide rail 22. In the retracted state, the net screen is rolled up in the magazine 28 of the separation device to save space.

The drive bow 24 is driven by an electric motor 30, for example, by a thrust element chain 32 and/or a drive cable.

As a sensor, a motor current detection device 34 is connected to the electric motor 30 and measures the current flowing through the electric motor 30 when the drive bow 24 is being driven. The measured current is communicated to a control 35 which ascertains whether the motor current is assuming impermissible values or not.

On the end of the guide rail 22, there is an end position sensor 36 which is actuated by the drive bow 24 when the end position is reached. Actuation of the end position sensor 36 is likewise communicated to the control 35. The end position sensor 36 can be made, for example, as a microswitch.

Figure 2:
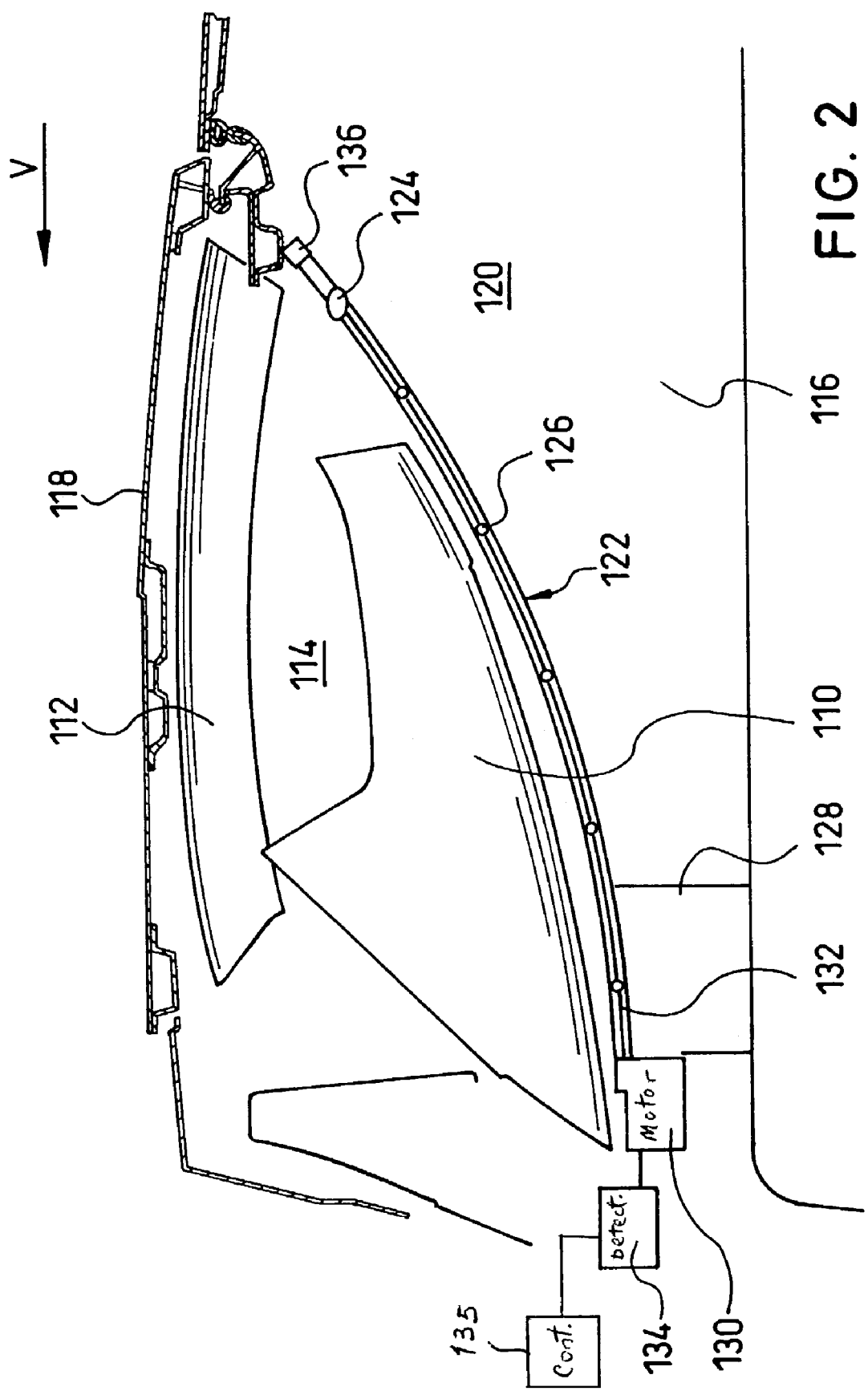
FIG. 2 shows a view of a second embodiment of the motor vehicle in accordance with the invention in a view corresponding to that of FIG. 1.

In FIG. 2, the same components as in FIG. 1 are provided with the same reference number, but increased by 100. To the extent the same components as in FIG. 1 are present, reference is made expressly to the description of FIG. 1.

Figure 5:
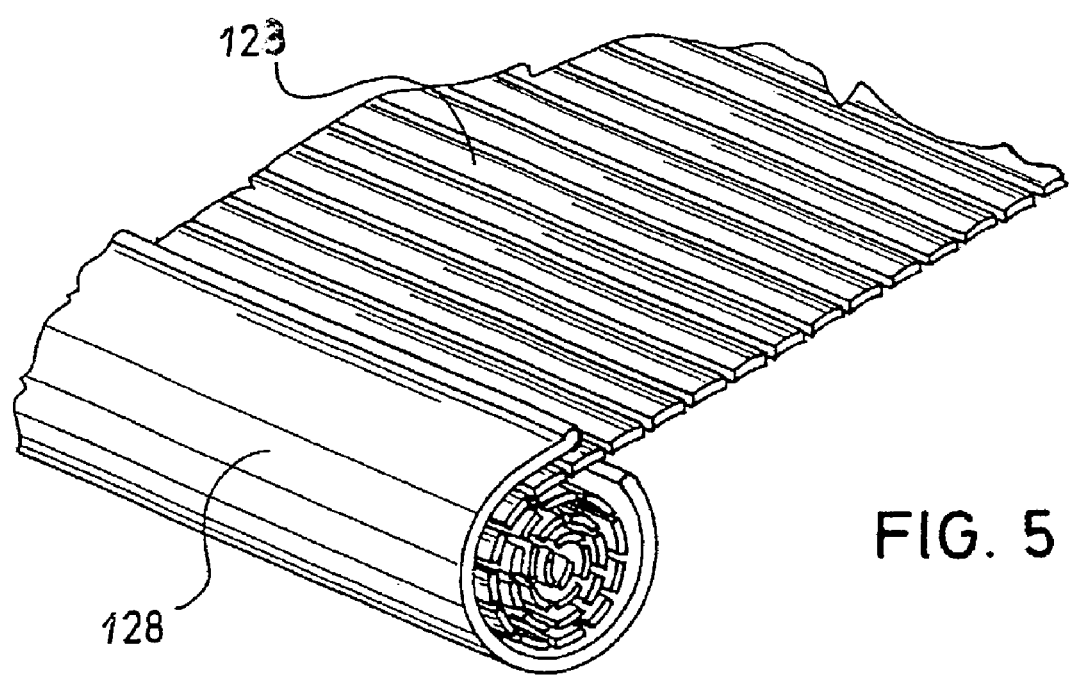
FIG. 5 shows an embodiment using a louvered screen as a separation device.

The version which is shown in FIG. 2 differs from the one shown in FIG. 1 in that the separation device is formed of sliding plates of a louvered screen 132 (FIG. 5) which are withdrawn from a magazine 128 of the separation device, in which they are stored stacked.

Figure 3:
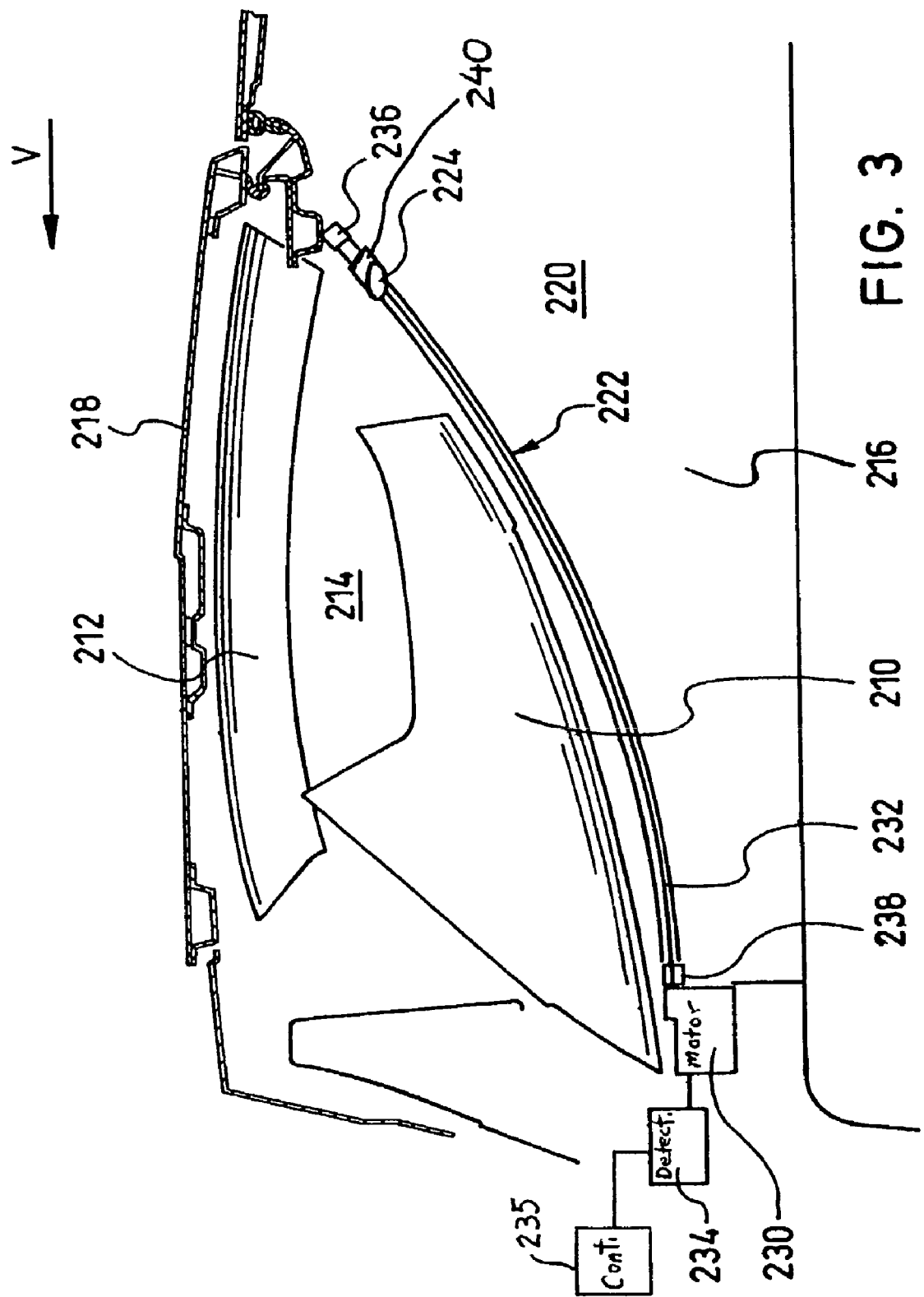
FIG. 3 shows a view of a third embodiment of the motor vehicle in accordance with the invention in a view corresponding to that of FIG. 1.

In FIG. 3, the same components as in FIG. 1 are provided with the same reference number, but increased by 200. For the description of the components which agree with FIG. 1 reference is made expressly to the description of FIG. 1.

In FIG. 3, a physically separating barrier is not attached to the drive bow 224. Instead, only the drive bow 224 is moved along the guide rail 222 with components 210 and 212 by the electric motor 230 before stowing the hardtop to determine if an obstructions lie in its path of movement. The advantage over the embodiments shown in FIGS. 1 and 2 is that a barrier need not be moved to clear the convertible top stowage volume for holding luggage with the convertible top closed (passenger compartment is covered) it being possible to insert articles even though the bow 224 has not been returned to the beginning of its path of movement. In this embodiment, there are end position sensors on the both lengthwise ends of the guide rail 222, one end position sensor 236 on the end away from the drive and one end position Sensor 238 on the end of the guide rail 222 near the drive. In this way, object detection can be produced by movement of the bow from front to rear along its path of movement for obstruction sensing, and then the next time it can be moved from rear to front for the same purpose. A collision sensor 240 may be provided on drive bow (movement element) 224 for detecting at least impending collision of the bow with an article in the path of movement of the bow. The collision sensor 240 may be one of a contact sensor and a photoelectric barrier.

The features of the invention disclosed in the specification above, and in the drawings, can be implemented invention both individually and also in any combination.

What is claimed is:

1. Cabriolet vehicle having a combined convertible top-luggage stowage space of which a first partial volume constitutes a convertible top stowage volume for storing at least a portion of a collapsible vehicle roof, and a second partial volume constitutes a luggage stowage volume which borders the convertible top stowage volume, and a checking device for checking the convertible top stowage volume, the checking device having a movement element which is movable along a boundary between the convertible top stowage volume and the luggage stowage volume independent of the vehicle roof, wherein the movement element of the checking device is an elongated bow which extends laterally across the stowage space and is driven along said boundary by a remotely controllable drive device and wherein the checking device is provided with sensor means for detecting the presence of articles which project from the luggage stowage volume into the convertible top stowage volume during the motion of the elongated bow, wherein the sensor means comprises a monitoring means for monitoring a quantity which is proportional to a drive force required by the drive device for moving the elongated bow; and wherein the sensor means are connected to a control for reporting detected values of the monitored quantity thereto, said control being adapted to compare the detected values reported with a predetermined threshold value which separates an impermissible range of values from an allowable range of values and then outputs a warning signal and triggers a controller for blocking movement of at least a convertible top drive when the detected values are in the impermissible range.

2. Cabriolet vehicle as claimed in claim 1, wherein the drive device for moving the movement element is an electric motor and the quantity which is monitored by the sensor means is the motor current which flows through the electric motor.

3. Cabriolet vehicle as claimed in claim 1, further including at least one end position sensor located at at least one end point of a path of movement of the elongated bow.

4. Cabriolet vehicle as claimed in claim 3, wherein the at least one end position sensor is adapted to report to the controller that the at least one end position sensor has been reached, the control being adapted to release at least said convertible top drive in response to said report.

5. Cabriolet vehicle as claimed in claim 1, further comprising a separation device by which the convertible top stowage volume is separatable from the luggage stowage volume, said separation device being connected to said elongated bow.

6. Cabriolet vehicle as claimed in claim 5, wherein the separation device is one of a separating net screen and a separating louvered screen.

7. Checking device for a cabriolet vehicle having a combined convertible top-luggage stowage space of which a first partial volume constitutes a convertible top stowage volume for storing at least a portion of a vehicle roof, and a second partial volume constitutes a luggage stowage volume which borders the convertible top stowage volume, the checking device having a movement element adapted for installation in the combined convertible top-luggage stowage space for movement along a boundary between the convertible top stowage volume and the luggage stowage volume independent of the vehicle roof, wherein the movement element of the checking device is an elongated bow which extends laterally across the stowage space and is driven along said boundary by a remotely controllable drive device and wherein the checking device is provided with sensor means for detecting the presence of articles which project from the luggage stowage volume into the convertible top stowage volume during the motion of the elongated bow, wherein the sensor means comprises a monitoring means for monitoring a quantity which is proportional to a drive force required by the drive device for moving the elongated bow;

further including at least one end position sensor located at at least one end point of a path of movement of the elongated bow; wherein the at least one end position sensor is adapted to report to the monitoring means that the at least one end position sensor has been reached, the monitoring means being adapted to release at least a convertible top drive in response to said report.

8. Checking device as claimed in claim 7, wherein the drive device for moving the elongated bow is an electric motor and the quantity which is monitored by the sensor means is the motor current which flows trough the electric motor.

9. Cabriolet vehicle as claimed in claim 7, further comprising a separation device by which the convertible top stowage volume is separatable from the luggage stowage volume, said separation device being connected to said elongated bow.

10. Cabriolet vehicle having a combined convertible top-luggage stowage space of which a first partial volume constitutes a convertible top stowage volume for storing at least a portion of a collapsible vehicle roof, and a second partial volume constitutes a luggage stowage volume which borders the convertible top stowage volume, and a checking device for chocking the convertible top stowage volume, the checking device having a movement element which is movable along a boundary between the convertible top stowage volume and the luggage stowage volume independent of the vehicle roof, wherein the movement element of the checking device is an elongated bow which extends laterally across the stowage space and is driven by a remotely controllable drive device and wherein the checking device is provided with sensor means for detecting the presence of articles which project from the luggage stowage volume into the convertible top stowage volume during the motion of the elongated bow, said sensor means comprising a collision sensor on the movement element for detecting collision of the movement element with an article in a path of movement of the movement element; and wherein the collision sensor is adapted to output a warning signal and triggers a controller for blocking movement of at least a convertible top drive when collision of the elongated bow and an object in the combined convertible top-luggage stowage space is detected.

11. Cabriolet vehicle as claimed in claim 10, wherein the collision sensor is one of a contact sensor and a photoelectric burner.

12. Cabriolet vehicle as claimed in claim 10, further including at least one end position sensor located at at least one end point of a path of movement of the elongated bow.

13. Cabriolet vehicle as claimed in claim 12, wherein the at least one end position sensor is adapted to report to the controller that the at least one end position sensor has been reached, the controller being adapted to release at least a convertible top drive in response to said report.

14. Cabriolet vehicle as claimed in claim 10, further comprising a separation device by which the convertible top stowage volume is separatable from the luggage stowage volume, said separation device being connected to said elongated bow.

15. Cabriolet vehicle as claimed in claim 14, wherein the separation device is one of a separating net screen and a separating louvered screen.

16. Checking device for a cabriolet vehicle having a combined convertible top-luggage stowage space of which a first partial volume constitutes a convertible top stowage volume for storing at least a portion of a vehicle roof, and a second partial volume constitutes a luggage stowage volume which borders the convertible top stowage volume, the checking device having a movement element adapted for installation in the combined convertible top-luggage stowage space far movement along a boundary between the convertible top stowage volume and the luggage stowage volume independent of the vehicle roof, wherein the movement element of the checking device is an elongated bow which extends laterally across the stowage space and is driven by a remotely controllable drive device and wherein the checking device is provided wit sensor means for detecting the presence of articles which project from the luggage stowage volume into the convertible top stowage volume during the motion of the elongated bow, said sensor means comprising a collision sensor on the movement element for detecting collision of the movement element with an article in a path of movement of the movement element; and wherein the collision sensor is adapted to output a warning signal and triggers a controller for blocking movement of at least a convertible top drive when collision of the movement element and an object in the combined convertible top-luggage stowage space is detected.

17. Checking device as claimed in claim 16, wherein the drive device for moving the elongated bow is an electric motor and a quantity which is monitored by the sensor means is the motor current which flows through the electric motor.

18. Checking device as claimed in claim 16, wherein the collision sensor is one of a contact sensor and a photoelectric barrier.

19. Checking device as claimed in claim 16, further including at least one end position sensor located at at least one end point of a path of movement of the elongated bow.

20. Cabriolet vehicle as claimed in claim 19, wherein the at least one end position sensor is adapted Lo report to the controller that the at least one end position sensor has been reached, the controller being adapted to release said convertible top drive in response to said report.

21. Cabriolet vehicle as claimed in claim 16, further comprising a separation device by which the convertible top stowage volume is separatable from the luggage stowage volume.

22. Cabriolet vehicle as claimed in claim 1, wherein the movement element is bow that is movable by itself.

23. Checking device as claimed in claim 7, wherein the movement element is a bow that is movable by itself.

24. Cabriolet vehicle as claimed in claim 10, wherein the movement element is a bow that is movable by itself.

25. Checking device as claimed in claim 16, wherein the movement element is a bow that is movable by itself.

26. Cabriolet vehicle as claimed in claim 1, wherein said boundary has an arcuate curvature.

27. Cabriolet vehicle as claimed in claim 10, wherein said boundary has an arcuate curvature.

* * * * *